United States Patent
Silverbrook et al.

(10) Patent No.: US 6,331,946 B1
(45) Date of Patent: Dec. 18, 2001

(54) METHOD FOR PROTECTING ON-CHIP MEMORY (FLASH AND RAM) AGAINST ATTACKS

(75) Inventors: Kia Silverbrook; Simon Robert Walmsley, both of Sydney (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/112,737

(22) Filed: Jul. 10, 1998

(30) Foreign Application Priority Data

Jul. 15, 1997 (AU) .................................................. PO7991

(51) Int. Cl.$^7$ .................................................. G11C 16/04
(52) U.S. Cl. .................................. 365/185.04; 365/185.03
(58) Field of Search .............................. 365/180, 185.03, 365/185.04, 203, 185.22, 189.01, 185.21, 149, 226, 45, 183, 154; 711/103, 163, 164; 713/200

(56) References Cited

U.S. PATENT DOCUMENTS

| | | | |
|---|---|---|---|
| 4,023,149 | * 5/1977 | Bormann et al. | 365/154 |
| 4,139,910 | * 2/1979 | Anantha et al. | 365/183 |
| 4,300,210 | * 11/1981 | Chakravarti et al. | 365/45 |
| 5,054,001 | * 10/1991 | Guillot | 365/226 |
| 5,184,324 | * 2/1993 | Ohta | 365/149 |
| 5,218,569 | * 6/1993 | Banks | 365/185.21 |
| 5,351,210 | * 9/1994 | Saito | 365/189.01 |
| 5,539,690 | * 7/1996 | Talreja et al. | 365/185.22 |
| 5,844,841 | * 12/1998 | Takeuchi et al. | 365/185.03 |
| 5,963,076 | * 10/1999 | Shor et al. | 327/313 |

* cited by examiner

*Primary Examiner*—John A. Follansbee

(57) ABSTRACT

In security applications, an authentication key may be stored in non-volatile memory on a semiconductor chip. If a supply of these chips with the same authentication key is available, the key may be cracked by successively setting bits of the key using a focussed ion beam, laser, or other means of locally modifying a chip. This invention prevents discovery of the key by storing the key in multi-level memory (e.g. 4 level flash or E-EPROM) with the minimum and maximum levels representing invalid states, and the authentication key being stored on intermediate levels.

3 Claims, 1 Drawing Sheet

METHOD FOR PROTECTING ON-CHIP MEMORY (FLASH AND RAM) AGAINST ATTACKS

CROSS REFERENCES TO RELATED APPLICATIONS

The following co-pending U.S. patent applications, identified by their U.S. patent application serial numbers (USSN), were filed simultaneously to the present application on Jul. 10, 1998, and are hereby incorporated by cross-reference.

| DOCKET NO. | DOCKET NO. | DOCKET NO. | DOCKET NO. |
|---|---|---|---|
| 09/113,060 (ART01) | 09/113,070 (ART02) | 09/113,073 (ART03) | 09/112,748 (ART04) |
| 09/112,747 (ART06) | 09/112,776 (ART07) now U.S. Pat. No. 6,227,648 | 09/112,750 (ART08) | 09/112,746 (ART09) |
| 09/112,743 (ART10) | 09/112,742 (ART11) | 09/112,741 (ART12) | 09/112,740 (ART13) now U.S. Pat. No. 6,196,541 |
| 09/112,739 (ART15) now U.S. Pat. No. 6,195,150 | 09/113,053 (ART16) | 09/112,738 (ART17) | 09/113,067 (ART18) |
| 09/113,063 (ART19) | 09/113,069 (ART20) | 09/112,744 (ART21) | 09/113,058 (ART22) |
| 09/112,777 (ART24) | 09/113,224 (ART25) | 09/112,804 (ART26) | 09/112,805 (ART27) |
| 09/113,072 (ART28) | 09/112,785 (ART29) | 09/112,797 (ART30) now U.S. Pat. No. 6,137,500 | 09/112,796 (ART31) |
| 09/113,071 (ART32) | 09/112,824 (ART33) | 09/113,090 (ART34) | 09/112,823 (ART38) |
| 09/113,222 (ART39) | 09/112,786 (ART42) | 09/113,051 (ART43) | 09/112,782 (ART44) |
| 09/113,056 (ART45) | 09/113,059 (ART46) | 09/113,091 (ART47) | 09/112,753 (ART48) |
| 09/113,055 (ART50) | 09/113,057 (ART51) | 09/113,054 (ART52) | 09/112,752 (ART53) |
| 09/112,759 (ART54) | 09/112,757 (ART56) | 09/112,758 (ART57) | 09/113,107 (ART58) |
| 09/112,829 (ART59) | 09/112,792 (ART60) | 09/112,791 (ART61) now U.S. Pat. No. 6,106,147 | 09/112,790 (ART62) |
| 09/112,789 (ART63) | 09/112,788 (ART64) | 09/112,795 (ART65) | 09/112,749 (ART66) |
| 09/112,784 (ART68) | 09/112,783 (ART69) now U.S. Pat. No. 6,217,165 | 09/112,781 (DOT01) | 09/113,052 (DOT02) |
| 09/112,834 (Fluid01) | 09/113,103 (Fluid02) | 09/113,101 (Fluid03) | 09/112,751 (IJ01) now U.S. Pat. No. 6,227,652 |
| 09/112,787 (IJ02) | 09/112,802 (IJ03) now U.S. Pat. No. 6,213,589 | 09/112,803 (IJ04) now U.S. Pat. No. 6,231,136 | 09/113,097 (IJ05) |
| 09/113,099 (IJ06) | 09/113,084 (IJ07) | 09/113,066 (IJ08) | 09/112,778 (IJ09) |
| 09/112,779 (IJ10) now U.S. Pat. No. 6,220,694 | 09/113,077 (IJ11) | 09/113,061 (IJ12) | 09/112,818 (IJ13) |
| 09/112,816 (IJ14) | 09/112,772 (IJ15) now U.S. Pat. No. 6,264,306 | 09/112,819 (IJ16) | 09/112,815 (IJ17) |
| 09/113,096 (IJ18) | 09/113,068 (IJ19) | 09/113,095 (IJ20) | 09/112,808 (IJ21) |
| 09/112,809 (IJ22) | 09/112,780 (IJ23) now U.S. Pat. No. 6,239,821 | 09/113,083 (IJ24) | 09/113,121 (IJ25) |
| 09/113,122 (IJ26) | 09/112,793 (IJ27) | 09/112,794 (IJ28) | 09/113,128 (IJ29) |
| 09/113,127 (IJ30) | 09/112,756 (IJ31) now U.S. Pat. No. 6,227,653 | 09/112,755 (IJ32) now U.S. Pat. No. 6,234,609 | 09/112,754 (IJ33) now U.S. Pat. No. 6,238,040 |
| 09/112,811 (IJ34) now U.S. Pat. No. 6,188,415 | 09/112,812 (IJ35) now U.S. Pat. No. 6,227,654 | 09/112,813 (IJ36) | 09/112,814 (IJ37) |
| 09/112,764 (IJ38) | 09/112,765 (IJ39) now U.S. Pat. No. 6,217,153 | 09/112,767 (IJ40) | 09/112,768 (IJ41) now U.S. Pat. No. 6,243,113 |
| 09/112,807 (IJ42) | 09/112,806 (IJ43) now U.S. Pat. No. 6,247,790 | 09/112,820 (IJ44) | 09/112,821 (IJ45) |
| 09/112,822 (IJM01) | 09/112,825 (IJM02) | 09/112,826 (IJM03) | 09/112,827 (IJM04) |
| 09/112,828 (IJM05) | 09/113,111 (IJM06) | 09/113,108 (IJM07) | 09/113,109 (IJM08) |
| 09/113,123 (IJM09) | 09/113,114 (IJM10) | 09/113,115 (IJM11) | 09/113,129 (IJM12) |
| 09/113,124 (IJM13) | 09/113,125 (IJM14) | 09/113,126 (IJM15) | 09/113,119 (IJM16) |
| 09/113,120 (IJM17) | 09/113,221 (IJM18) | 09/113,116 (IJM19) | 09/113,118 (IJM20) |
| 09/113,117 (IJM21) | 09/113,113 (IJM22) | 09/113,130 (IJM23) | 09/113,110 (IJM24) |
| 09/113,112 (IJM25) | 09/113,087 (IJM26) | 09/113,074 (IJM27) | 09/113,089 (IJM28) |

-continued

| DOCKET NO. | DOCKET NO. | DOCKET NO. | DOCKET NO. |
|---|---|---|---|
| 09/113,088 (IJM29) | 09/112,771 (IJM30) | 09/112,769 (IJM31) now U.S. Pat. No. 6,264,849 | 09/112,770 (IJM32) now U.S. Pat. No. 6,254,793 |
| 09/112,817 (IJM33) | 09/113,076 (IJM34) | 09/112,798 (IJM35) now U.S. Pat. No. 6,235,211 | 09/112,801 (IJM36) |
| 09/112,800 (IJM37) now U.S. Pat. No. 6,264,850 | 09/112,799 (IJM38) now U.S. Pat. No. 6,258,284 | 09/113,098 (IJM39) | 09/112,833 (IJM40) |
| 09/112,832 (IJM41) | 09/112,831 (IJM42) | 09/112,830 (IJM43) | 09/112,836 (IJM44) |
| 09/112,835 (JM45) | 09/113,102 (IR01) | 09/113,106 (IR02) | 09/113,105 (IR04) |
| 09/113,104 (IR05) | 09/112,810 (IR06) | 09/112,766 (IR10) | 09/113,085 (IR12) |
| 09/113,086 (IR13) | 09/113,094 (IR14) | 09/112,760 (IR16) | 09/112,773 (IR17) now U.S. Pat. No. 6,196,739 |
| 09/112,774 (IR18) | 09/112,775 (IR19) | 09/112,745 (IR20) now U.S. Pat. No. 6,152,619 | 09/113,092 (R21) |
| 09/113,100 (MEMS02) | 09/113,093 (MEMS03) | 09/113,062 (MEMS04) | 09/113,064 (MEMS05) |
| 09/113,082 (MEMS06) | 09/113,081 (MEMS07) | 09/113,080 (MEMS09) | 09/113,079 (MEMS10) |
| 09/113,065 (MEMS11) | 09/113,078 (MEMS12) | 09/113,075 (MEMS13). | |

STATEMENT REGARDING FEDERALLY SPONSORED RESEARCH OR DEVELOPMENT

Not applicable.

FIELD OF THE INVENTION

The present invention relates to tamper proof integrated circuit devices.

BACKGROUND OF THE INVENTION

Secure chips such as Smart Cards often contain program codes as well as secret key information. Unfortunately, such systems are open to attack by means of reverse engineering or the like.

In secure chip applications, there are problems associated with storing program code and keys in internal ROM or Flash memory. For example, single bits in a ROM can be overwritten using a laser cutter microscope, to either 1 or 0 depending on the sense of the logic. With a given opcode/operand set, it may be a simple matter for an attacker to change program code from a conditional jump to a non-conditional jump, or perhaps change the destination of a register transfer. If the target instruction is chosen carefully, it may result in the key being revealed.

EEPROM/Flash attacks are similar to ROM attacks except that the laser cutter microscope technique can be used to both set and reset individual bits. This gives much greater scope in terms of modification of algorithms.

Alternatively, instead of trying to read the Flash memory, an attacker may simply set a single bit by use of a laser cutter microscope. Although the attacker doesn't know the previous value, they know the new value. If the chip still works, the bit's original state must be the same as the new state. If the chip doesn't work any longer, the bit's original state must be the logical NOT of the current state. An attacker can perform this attack on each bit of the key and obtain the n-bit key using at most n chips (if the new bit matched the old bit, a new chip is not required for determining the next bit).

It is not enough to simply store secret information or program code in Flash memory. The Flash memory and RAM must be protected from an attacker who would attempt to modify (or set) a particular bit of program code or key information.

SUMMARY OF THE INVENTION

It is an object of the present invention to provide a novel way of using multi-level Flash memory and parity to make internal chip data storage more secure against a number of physical attacks.

In accordance with a first aspect of the present invention, there is provided a method of providing for resistance to monitoring of an memory circuit having multiple level states corresponding to different output states, said method comprising utilizing the intermediate states only for valid output state. The memory can comprise flash memory and can further include one or more parity bits.

DESCRIPTION OF PREFERRED AND OTHER EMBODIMENTS

Figure 1:
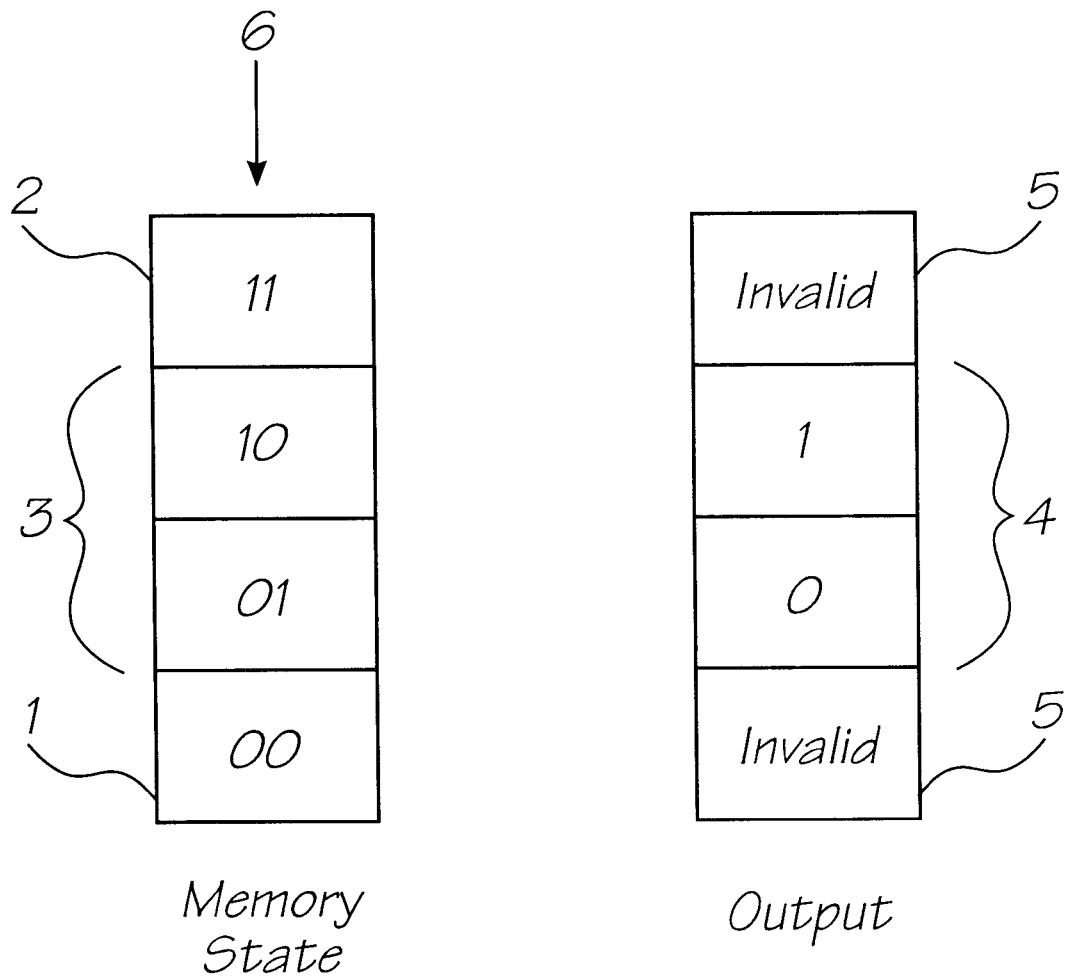
FIG. 1 is a multi-level memory with corresponding output.

The preferred embodiment as shown in FIG. 1, proceeds by using a Flash memory having a multi-level data storage 6, but to only use a subset of those multiple levels for valid bit representations. Normally, when multi-level Flash storage 6 is used, a single floating gate holds more than one bit. For example, a 4-voltage-state transistor can represent two bits. Assuming a minimum and maximum voltage representing 001 and 112 respectively, the two middle voltages represent 01 and 103. In the preferred embodiment, the two middle voltages are used to represent a single bit 4, and the two extremes 5 are considered to be invalid states. If an attacker attempts to force the state of a bit one way or the other by closing or cutting the gate's circuit, an invalid voltage (and hence invalid state) results.

For RAM (such as working registers) the principal can be extended by the use of a parity bit. The data part of the register can be checked against the parity bit (which will not match after an attack). Parity has traditionally been used to protect external memory against errors (eg for space missions to protect against unintentional chip damage due to ionization, radiation etc). However, using parity within the operating part of a chip, on working registers is very different. In this case at the parity is as a check against a deliberate attack.

The bits coming from Flash and RAM can therefore be validated by a number of test units (one per bit). The tests can be connected to the common Tamper Detection Line. Otherwise the tests can be connected to the chip's RESET or erase circuitry, to take appropriate action in the case of a detected attack.

This concept has applications in any chip that manipulates secure data. This includes Smart Cards, Authentication chips, electronic keys, and cryptographic equipment.

The present invention has be developed for utilization in an Artcam device, the details of which are set out in the following paragraphs although it is not restricted thereto.

We claim:

1. A method of providing for resistance to monitoring of an memory circuit having multiple level states corresponding to different output states, said method comprising utilizing the intermediate states only for valid output states.

2. A method as claimed in claim 1 wherein said memory comprises flash memory.

3. A method as claimed in claim 1 wherein said memory includes a parity bit.

\* \* \* \* \*